United States Patent
Halladay et al.

(10) Patent No.: US 6,918,987 B2
(45) Date of Patent: Jul. 19, 2005

(54) SURFACE PREPARATION OF RUBBER FOR COATINGS OR BONDING

(75) Inventors: James R. Halladay, Harborcreek, PA (US); Monil S. Shah, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 10/360,031

(22) Filed: Feb. 7, 2003

(65) Prior Publication Data

US 2004/0157983 A1 Aug. 12, 2004

(51) Int. Cl.[7] ............................................. C09D 183/04
(52) U.S. Cl. ............ 156/326; 106/287.14; 106/287.27; 106/287.28; 427/322; 427/316
(58) Field of Search ...................... 156/326; 106/287.14, 106/287.27, 287.28; 427/322, 316, 387

(56) References Cited

U.S. PATENT DOCUMENTS

| 3,940,548 A | | 2/1976 | Todani et al. | |
|---|---|---|---|---|
| 4,544,427 A | * | 10/1985 | Hausch | 156/97 |
| 4,711,820 A | * | 12/1987 | Arkles et al. | 428/429 |
| 5,122,519 A | * | 6/1992 | Ritter | 514/152 |
| 5,258,535 A | * | 11/1993 | Ishikawa et al. | 556/430 |
| 6,251,375 B1 | * | 6/2001 | Bara | 424/61 |

FOREIGN PATENT DOCUMENTS

WO    WO 92/13497    8/1992

* cited by examiner

*Primary Examiner*—Margaret G. Moore
(74) *Attorney, Agent, or Firm*—Miles B. Dearth

(57) ABSTRACT

The disclosure is directed to a treatment composition comprising a halogen bearing compound, a volatile siloxane fluid and at least one solvent. In another aspect, there is disclosed a method for treatment of molded rubber articles by applying a treatment composition to a rubber article to form a treated surface, followed by applying an adhesive or a coating to at least a portion of the treated surface.

10 Claims, No Drawings

SURFACE PREPARATION OF RUBBER FOR COATINGS OR BONDING

FIELD OF THE INVENTION

The invention is directed to elastomer surfaces, especially elastomer containing natural rubber, polybutadiene, styrene butadiene, and blends thereof, the preparation for coating or bonding in the use of halogenating agents.

BACKGROUND

Untreated surfaces of molded rubber comprising non-polar elastomers such as natural rubber, polyisoprene, polybutadiene, thermoplastic elastomers, and styrene butadiene, including blends often exhibit inadequate adhesion to adhesives and coatings. Even though an adhesive or coating may have excellent bond strength to a non-elastomer substrate material such as a metal, fiber, wood, or glass, in bonding of those substrates to such surfaces of cured elastomers, the composite article can delaminate under mechanical stress, the influence of chemical agents such as salt, solvents, etc., weathering, or a combination of factors.

Accordingly, various primers and pretreatments treatments have so far been performed on the surface of the shaped rubber articles used as a base material. Surface chlorination of rubber has long been proposed for the improving adhesion, reducing tackiness and decreasing the coefficient of friction of rubber. (See Romberg, "Aqueous Chlorination of Natural Rubber Surfaces", A.C.S. Rubber Division, Spring Meeting (1986); T.C.Q. Noakes, Proc. Int. Rubb. Technol. Conf., Penang, Malaysia (1988); Natural Rubber Technical Information Sheet No. 17, The Malaysian Rubber Producers' Research Association, Latex Series (1977); D. C. Blackley, "High Polymer Latices", Palmerton Publishing Company (1966), p. 548, and PCT/GB92/00171, published as WO 92 13497.

It is known to treat elastomer surfaces with sulfuric acid, or hypochlorite such as alkyl hypohalite, e.g., t-butyl hypochlorite or t-butyl hypobromite. See U.S. Pat. No. 3,940,548.

It is also known from British Patent specification Nos. 1,295,677 and 1,293,842 to use halogenation donors. The halogenation donors proposed are in general chlorine donors such as trichloroisocyanuric acid, dibromodimethylhydantoin, and N-halogen sulphonamide such as N-chloroparatoluenesulphonamide.

Adhesion of adhesives and coatings to molded rubber surfaces can be interfered with by a variety of components used in the rubber formulation, in the molding operation, or dressings applied to finished rubber articles. Interference with adhesion of coatings can be due to such components as sulfur, accelerators, waxes, process oils, plasticizer, antioxidants, antiozonants, mold releases, and silicone dressings, to name a few. Adhesion of coatings can be improved by mechanical abrading but this has obvious drawbacks including non-uniform bonding strength and loss of smooth glossy finish.

A well known treating agent containing a chlorinating agent is available from Lord Corporation under the Chemlok® 7701 designation. Proper steps need to be taken by cleaning the rubber surface prior to applying this product. An improvement would be desirable from the standpoint preparing a molded rubber surface in one step. It would be further advantageous to provide surface preparation materials that are not classified as hazardous air pollutants.

SUMMARY OF THE INVENTION

The invention is directed to solving the problems of easy preparation of polymer surfaces, especially rubber for subsequent bonding or coating. In accordance with the invention there is provided a treatment composition comprising a halogen bearing compound, a volatile siloxane fluid and at least one organic solvent.

In preferred embodiments, the composition components are selected so as to be free of hazardous air pollutants and volatile organic component (HAP and VOC)—as known under local, state and federal environmental regulations. Optional other solvents can be included, such as para-chlorobenzotrifluoride (PCBTF) at from 0 to 50 weight percent. The preferred treatment composition comprises from 0.05 to 15.0 wt. % of a chlorinating agent, such as trichloroisocyanuric acid, from 10 to 40 wt. % of a volatile silicone fluid such as hexamethyldisiloxane and from 50 to 89.95% of a solvent, such as methyl acetate.

In another aspect, there is provided a method for treatment of molded rubber articles by applying a treatment composition to a rubber article to form a treated surface, followed by applying an adhesive or a coating to at least a portion of the treated surface.

The preferred step of applying a coating includes coating a mixture of a carboxylated hydrogenated acrylonitrile-butadiene copolymer and a curing agent. A preferred method for coating further comprises the step of curing the coating by exposure to atmospheric moisture, heat (infra-red, thermal), by UV radiation, and/or by e-beam radiation.

DETAILED DESCRIPTION

The volatile siloxane is selected from disiloxanes, trisiloxanes and tetrasiloxanes which have a vapor pressure at 25° C. of from 1 mm to about 75 mm. Specific examples of these include hexamethyldisiloxane, octamethyltrisiloxane (4 mm @ 25° C.), hexamethylcyclotrisiloxane (10 mm @ 25°), and octamethylcyclotetrasiloxane (1.3 mm @ 25° C.). Hexamethylcyclotrisiloxane (10 mm @ 25° C.) is a solid at room temperature but can be dissolved in the solvent. Siloxanes having a vapor pressure less than 1 mm at 25° C. lack sufficient volatility to be useful at room temperature. The preferred volatile siloxane is hexamethyldisiloxane (55 mm @ 25° C.).

The halogen-bearing compound can be selected from known halocompounds bearing chlorine, bromine or iodine. The halogen compounds can be subdivided into hypohalous, activated halo substituted compounds, and halogen donors. Specific examples include tertiary butyl hypochlorite, tertiary butyl hypobromite, diethylbromomalonate, α-bromoacetophenone, bromoacetic acid, cinnamyl bromide, 1,4-dibromo-2-butene, iodoacetic acid. Activated halo-substituted compounds contain an activated carbon atom. An activated carbon atom is one bonded to at least one activating group such nitrile, carbonyl, aryl, vinyl, etc.

Other specific examples of halogen-bearing compounds are bromodiphenylmethane, 9-bromofluorene, diethyl bromomalonate, benzoyl bromide, cinnamyl bromide, 1,4-dibromo-2-butene, bromoacetic acid, 1,4-dibromo-2,3-butanedione, diethyl dibromomalonate, dibromoacetonitrile, tribromoacetaldehyde, α-bromoisobutyrophenone, ethyl 2-bromoisobutyrate, α,α,α,α-tetrabromo-σ-xylene and 9,10-dibromoanthracene. Some preferred halogen compounds include diethyl bromomalonate, bromoacetic acid and cinnamyl bromide.

Halogenated compounds also include halo-substituted urethanes such as N-monohaloalkylurethane, N,N- dihaloalkylurethane. Specific examples of halo-substituted urethanes are N,N-dichloroethylurethane, N,N-dibromoethylurethane, N,N-dichloropropylurethane, N,N-dibromopropylurethane, N,N-dichlorodibenzylurethane, and N,N-dibromobenzylurethane.

Additonal known halogen-bearing compounds include, and N-halogen sulphonamides such as N-chloroparatoluenesulphonamide, N,N-dihalogenarylsulfonamides such as N,N-dichloro-p-toluenesulfonamide, N,N-dibromotoluenesulfonamide, N,N-dichlorobenzenesulfonamide, N,N-dibromobenzenesulfonamide, halomethyl ether, thiocyanogen, iodine azide, bromine azide, iodine chloride, iodine bromide, trichloroacetic acid iodide, acetic acid bromide, iodine nitrate, alkyl hypohalite, alkyl thionylchloride, aryl thionylchloride, nitrosyl chloride, and nitrosyl bromide. The more preferred halogen-bearing compounds are halogenated isocyanuric acid, such as trichloroisocyanuric acid, and halogenated methylhydantoin, such as dibromodimethylhydantoin. Most preferred is trichloroisocyanuric acid.

The solvent can be any solvent that is miscible with and/or will dissolve the other ingredients. Examples of suitable solvents are halogenated hydrocarbons, such as carbon tetrachloride, chloroform, dichloromethane and the like; aromatic hydrocarbons, such as benzene, nitrobenzene, halogenated benzene, toluene, xylene and the like; chain or cyclic ethers, such as dimethyl ether, diethyl ether, tetrahydrofuran, dioxane and the like; esters, such as methyl acetate and ethyl acetate, and the like; aliphatic hydrocarbons, such as pentane, hexane, heptane, octane, cyclohexane and the like; ketones, such as acetone, cyclohexanone, methyl ethyl ketone and the like; alcohols, such as tertiary butyl alcohol, and mixtures and the like. Among them, tetrahydrofuran, dioxane, acetone, benzene, toluene, carbon tetrachloride, chloroform, methyl ethyl ketone, methyl acetate and ethyl acetate are preferred. Most preferred is methyl or ethyl acetate.

An optional second organic solvent can be employed. A preferred non-HAP, non-VOC second solvent is parachlorobenzotrifluoride (PCBTF).

The following preferred embodiments A and B, are HAP and VOC compliant:

|  | (wt %) | |
| --- | --- | --- |
|  | A | B |
| trichloroisocyanuric acid | 1% | 1% |
| volatile siloxane | 25% | 25% |
| methyl acetate | 74% | 49% |
| PCBTF | — | 25% |

The adhesives or coatings applied to the treated surfaces are not limited with respect to the invention, are beyond the scope of this disclosure and are known in the art. Examples of typical adhesives employed in bonding the treated rubber in accordance with the invention typically contain the following additives such as polymers, dispersing agents, phenolic resins, i.e., novolaks, crosslinkers such as nitrosobenzenes, QDO, isocyanates, organosilanes, maleimide compounds, carbon black, silica, calcium carbonate, oxides of the metals Al, Ca, Zn, Mg, Pb, Zr, also zirconium salts, e.g. zirconium aluminate, and lead salts of inorganic and/or organic acids, e.g. basic lead carbonate. Coatings to be applied to a treated rubber surface include conventional rubber coatings such as solvent or aqueous polymeric coatings that are cured by a variety of known curing agents. Preferred coatings applied to the treated rubber surface are disclosed in U.S. co-pending application Ser. No. 10/007, 268 incorported herein by reference and contain a film forming polymer of various functionalized film forming polymers, a curing component, all in an aqueous carrier or organic solvent.

COMPARATIVE EXAMPLES

6×6×0.075 inch (15.24×15.24×0.19 cm) rubber pads molded from a 50:50 blend of natural rubber and polybutadiene, sulfur cured, carbon black reinforced, and having a 55 Durometer hardness were used. These specimens were wiped with a commercial silicon dressing A, and left sitting for 10 minutes, then wiped with commercial dressing B, and left standing for 10 minutes, followed by wiping a commercial dressing C and left sitting for 10 minutes. The specimens were washed with a commercial liquid detergent cleaner dried, and left sitting for 24 hours. A curable liquid elastomer coating was applied and allowed to cure. The specimens were tested for coating adhesion by a cross-hatch adhesion test.

| Cleaner | A | B | C | D |
| --- | --- | --- | --- | --- |
| Methyl acetate | 100 | — | 1.0 | 74.0 |
| Tetramethyldisiloxane | — | 100 | — | 25.0 |
| Trichloroisocyanuric acid | — | — | 1.0 | 1.0 |
| Crosshatch-Adhesion | 21% | 37% | 46% | 100% |

What is claimed is:

1. A treatment composition comprising 0.05 to 15.0 wt. % of a halogenating agent, from 10 to 40 wt. % of a volatile siloxane selected from a disiloxane, a trisiloxene and a tetrasiloxane having a vapor pressure at 25° C. of from 1 mm to about 75 mm, and from 50 to 89.95 wt. % of an organic solvent.

2. The composition according to claim 1 wherein said halogenating agent is selected from the group consisting of trichloroisocyanuric acid, dibromodimethylhydantoin, and N-chloroparatoluenesulphonamide.

3. The composition according to claim 1 wherein said siloxane is selected from the group consisting of hexamethyldisiloxane, octamethyltrisiloxane, hexamethylcyclotrisiloxane, and octamethylcyclotetrasiloxane.

4. The composition according to claim 1 wherein said organic solvent is selected from the group consisting of halogenated hydrocarbons, aromatic hydrocarbons, linear or cyclic ethers, dioxane; esters, aliphatic hydrocarbons, ketones, and alcohols.

5. The composition of claim 4 wherein said organic solvent is selected from the group consisting of chloroform, dichloromethane, carbon tetrachloride, benzene, nitrobenzene, halogenated benzene, toluene, xylene, dimethyl ether, diethyl ether, tetrahydrofuran, methyl acetate, acetone, methylethyl ketone, cyclohexanone, ethyl acetate, pentane, hexane, heptane, octane, cyclohexane, tertiary butyl alcohol, and mixtures thereof.

6. A method for the treatment of a molded rubber article comprising applying a treatment composition to the surface to form a treated surface, the treatment composition comprising a halogenating agent, a volatile siloxane selected from a disiloxane, a trisiloxane and a tetrasiloxane having a vapor pressure at 25° C. of from 1 mm to about 75 mm, and an organic solvent, and applying an adhesive or a coating to at least a portion of the treated surface.

7. The method according to claim 6 wherein said halogenating agent is selected from the group consisting of trichloroisocyanuric acid, dibromodimethylhydantoin, and N-chloroparatoluenesulphonamide.

8. The method according to claim 6 wherein said siloxane is selected from the group consisting of hexamethyldisiloxane, octamethyltrisiloxane, hexamethylcyclotrisiloxane, and octamethylcyclotetrasiloxane.

9. The method according to claim 6 wherein said organic solvent is selected from the group consisting of halogenated hydrocarbons, aromatic hydrocarbons, linear or cyclic ethers, dioxane; esters, aliphatic hydrocarbons, ketones, and alcohols.

10. The method of claim 9 wherein said organic solvent is selected from the group consisting of chloroform, dichloromethane, carbon tetrachloride, benzene, nitrobenzene, halogenated benzene, toluene, xylene, dimethyl ether, diethyl ether, tetrahydrofuran, methyl acetate, acetone, methylethyl ketone, cyclohexanone, ethyl acetate, pentane, hexane, heptane, octane, cyclohexane, tertiary butyl alcohol, and mixtures thereof.

* * * * *